Figure 3:
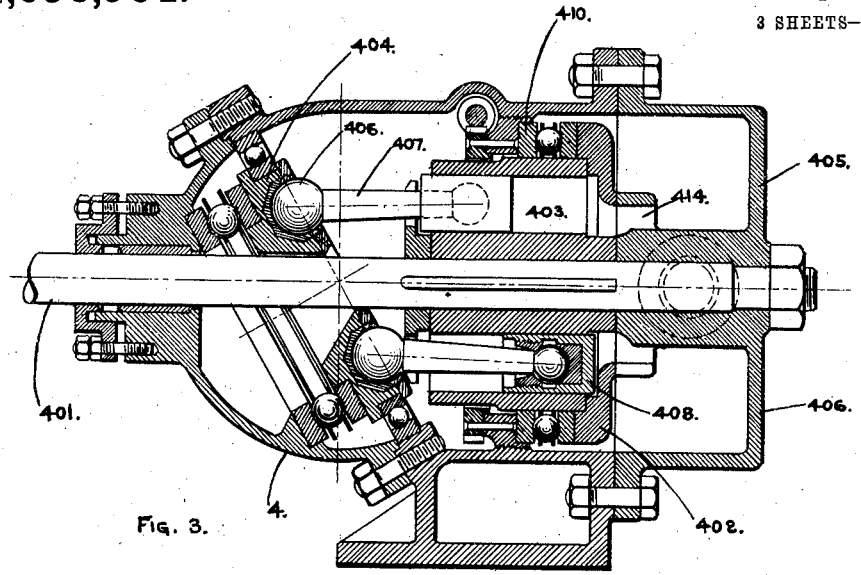

J. R. ANDREWS.
SHIP'S STEERING SYSTEM.
APPLICATION FILED DEC. 20, 1910.
1,093,964.
Patented Apr. 21, 1914.
3 SHEETS—SHEET 1.
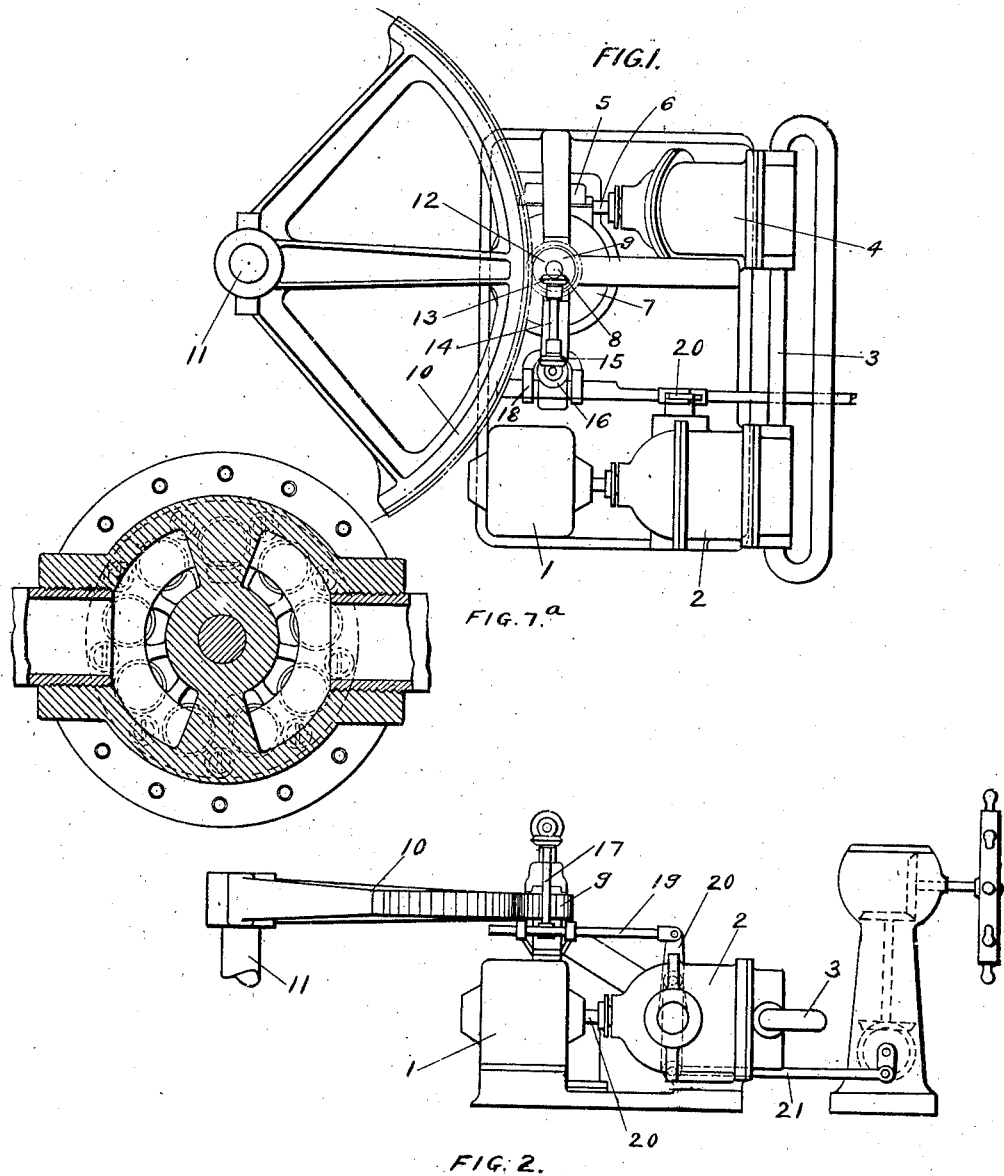
INVENTOR.
JACOB R. ANDREWS.

J. R. ANDREWS.
SHIP'S STEERING SYSTEM.
APPLICATION FILED DEC. 20, 1910.

1,093,964.

Patented Apr. 21, 1914.

3 SHEETS—SHEET 2.

WITNESSES:
Cecil E. Paine
Geneva L. Casey

INVENTOR.
JACOB R. ANDREWS.
BY
Spear, Middleton, Donaldson & Spear
ATTORNEY.

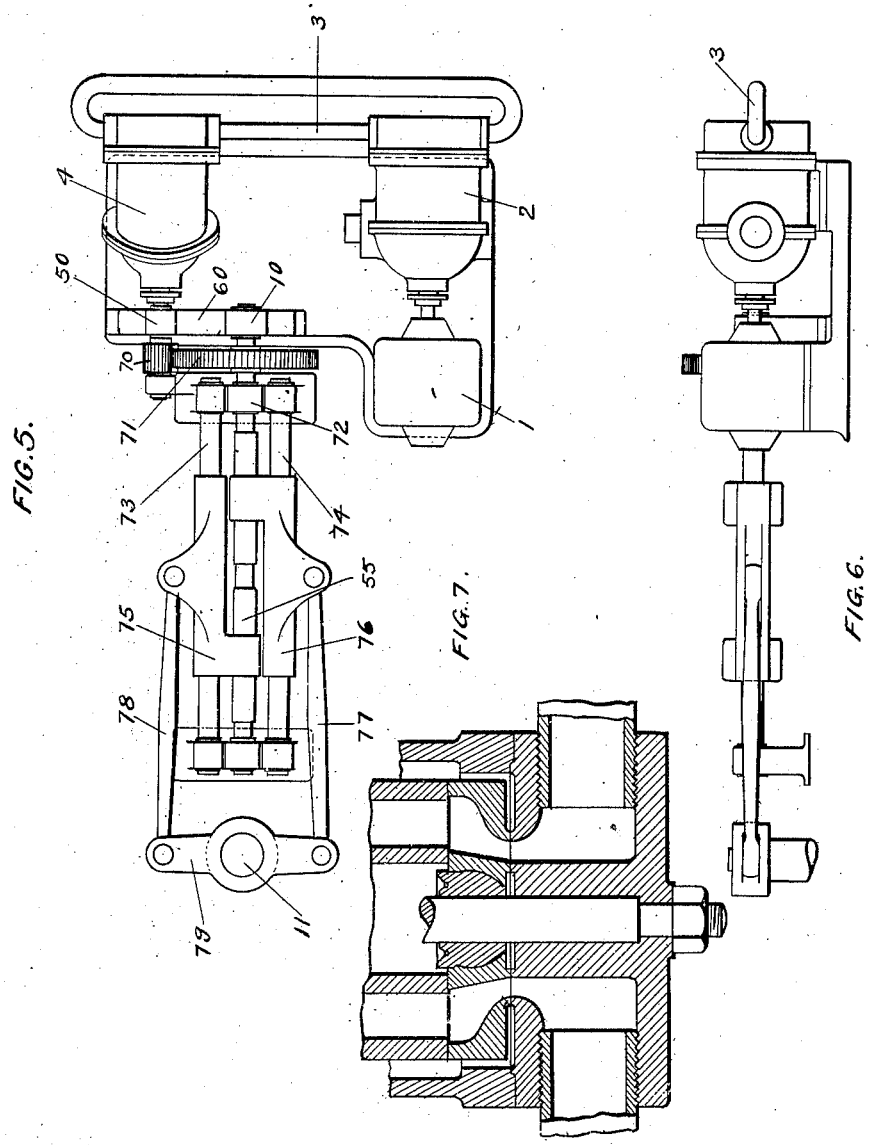

UNITED STATES PATENT OFFICE.

JACOB R. ANDREWS, OF BATH, MAINE.

SHIP'S STEERING SYSTEM.

1,093,964.  Specification of Letters Patent.  Patented Apr. 21, 1914.

Application filed December 20, 1910. Serial No. 598,367.

*To all whom it may concern:*

Be it known that I, JACOB R. ANDREWS, a citizen of the United States, residing at Bath, county of Sagadahoc, State of Maine, have invented certain new and useful Improvements in Ships' Steering Systems, of which the following is a specification.

This invention relates to power steering systems for vessels and particularly to the steering of a vessel from a constantly moving, one direction source of power.

In the handling of the helm of any ship by power, the great difficulty always lies in securing the rapid reversals necessary to prompt and accurate placing of the course. The sudden reversal of any source of power available for such use involves conditions dangerous to the source of power and elements of uncertainty which in critical moments might produce disastrous results.

The use of electricity for the purposes of ship steering has been much desired and frequently attempted, but the difficulties above suggested, especially that of reversal, have made it impossible to secure satisfactory results from the electric motor.

It is the object of the present invention to provide a system in which these difficulties are overcome. In it I have made possible the avoidance of reversal in the main motor so that a constantly running electric or other motor may be employed without reversal.

The nature and operation of my system will be more fully described in the specification which follows and in it I have described, as illustrative of my invention, a system in which a constantly running electric motor is employed to operate a steering gear through a variable stroke reversible pump which feeds a reversible fluid motor to secure operation at any speed and in either direction.

The system I have shown, in as much detail as seems necessary for the understanding of those skilled in the art, by drawings which form a part of the specification, like reference numerals being employed throughout to indicate corresponding parts.

Figure 4:
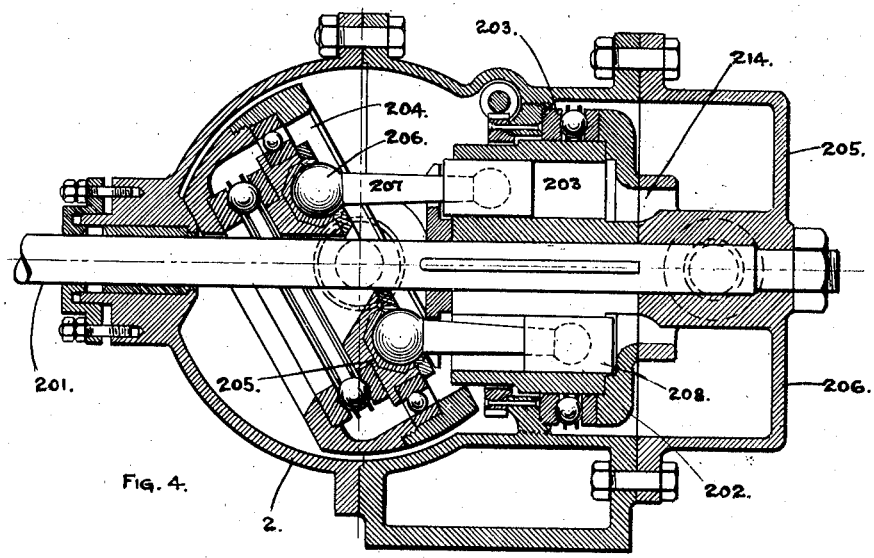

In the drawings: Figure 1 is a plan view of a system used with a quadrant steering gear, Fig. 2 is a side view of the same, Fig. 3 is a variable speed, reversible motor, Fig. 4 is a variable speed, reversible pump, Fig. 5 is a plan view corresponding to Fig. 1 but showing adaptation to screw steering gear, and, Fig. 6 is a side elevation of the system as applied in Fig. 5. Figs. 7 and 7$^a$ are transverse and longitudinal sectional views of the pump.

In practising my invention as shown in Figs. 1 and 2 I provide a motor 1 which is directly connected to a pump 2. This pump is connected by a pipe 3 to a fluid motor 4 which has a shaft 6, on which is worm 5. The worm 5 meshes with a gear 7 on a shaft 8, upon upper end of which is mounted a pinion 9, meshing with a segment 10 which is keyed to the rudder post 11. Above the pinion 9 and on the shaft 8 is a bevel gear 12, which meshes with another bevel gear 13 on a cross shaft 14, which through gears 15 and 16, operates the shaft 17. The shaft 17 is provided with a pinion 18 which engages a toothed rod 19 connected to the lever 20, which constitutes a follow-up gear for automatically cutting off the pump 2 after it has actuated the steering gear. The toothed bar 19 slides through suitable bearings on each side of the pinion 18 as indicated at 18$^a$. At the opposite end the lever 20 is connected to a rod 21 which may be connected to any suitable control at any part of the vessel. This may be an ordinary wheel connection or may be a telemotor connection from the bridge or any other part of the vessel.

The pump 2 may be any suitable variable speed, reversible pump, but I have found that a variable stroke pump is particularly well adapted for the operation of the system. Such a pump I have indicated in Fig. 4. The casing of the pump I have indicated as 2, and within this casing is suitably journaled a shaft 201, upon which is preferably mounted the motor 1, so as to secure a direct drive. Upon the shaft is splined a cylinder casing 202, bored with a plurality of cylinders 203, and rotatably mounted within the casing 2 with a suitable ball race 203$^a$. Loosely encircling shaft 201 is a head 204, which is provided with a plurality of sockets 205, within which are seated the rounded ends 206 of piston rods 207, which at their opposite ends are coupled by a similar ball and socket joint, to the pistons 208. The head 204 is journaled in the casing so as to be swung, and on the end of the bearing is mounted the lever 20 for controlling the same, as above explained.

The cylinders 203 are connected by ports 214 to chambers 205 and 206. These chambers 205 and 206 are separated by a partition which does not show in Fig. 4, but which divides this end of the casing near the vertical, so as to separate the intake and delivery sides of the pump. This pump is connected by the pipe circuit 3 to a motor 4 which is preferably of a structure similar to the pump itself.

Referring to Fig. 3 which shows a corresponding section of the motor, the casing 4 has journaled within it the shaft 6, which has on its end the worm 5 for driving the steering gear. Upon this shaft is keyed a motor head 402, which is mounted in a race 410. The head is bored with a plurality of cylinders 403 connected by ports 414 to chambers 405 and 406, vertically divided by a partition which is not shown but corresponding to that of the pump. Within the casing is fixed a head 404, socketed to receive the rounded ends 406 of piston rods 407, which at their opposite ends are correspondingly socketed in pistons 408, which work within the cylinders 403.

Referring back to Fig. 1, it will be seen that the pump 2 may be operated in either direction and with a variable stroke, by simply rocking the head 204 within the casing, so that it will stand at any angle out of the vertical in every phase; that is to say, in the position shown in Fig. 4 it will pump with a maximum stroke ahead, while if swung to the opposite phase, it would supply liquid to the motor 4 with a maximum stroke in reverse, thus reversing the motor 4. When the head 204 is vertical, the pump is idle, as the rotation of the head will effect no stroke delivery.

Referring to Fig. 3, it will be seen that the liquid supplied by the pump will operate the piston 408 in either direction, according to the phase of the pump and according to whether the chamber 405 or 406 is used as an entry port or exhaust port.

The stroke of the motor is varied according to the quantity of liquid delivered at each stroke of the pump, and the shaft 6 is given a corresponding rotation speed which turns the worm 5 and operates the segment 10 to secure the desired movement of the rudder post 11. In this way it will be seen that the rudder may be turned at any speed and in either direction with the utmost accuracy and entirely regardless of the speed or direction of the motor 1, which may be run constantly in one direction.

My system may obviously be applied to other steering gear than the quadrant gear shown in Figs. 1 and 2; for example, it might be applied to the screw gear shown in Fig. 5. In Figs. 5 and 6 the motor 1 drives the pump 2, which operates the fluid motor 4, to turn a pinion 70, which operates a gear 71 rotating the screw shaft 55. This operates sliding members 75 and 76 which are connected by links 77 and 78 to the crosshead 79 set on the rudder post 11.

This illustrates the variety of adaptation possible with my system. The operation of the system shown in Figs. 5 and 6 would be the same as that explained in connection with Figs. 1 and 2, the only difference being in the operation of the steering gear which is a screw gear instead of a segment gear.

It will therefore be evident that my invention may be applied to any type of steering gear by providing a suitable connection. Various types of reversible and variable speed pumps may be employed and also various types of reversible and variable speed fluid motors may be used, to secure the transmission of power from a constantly moving electric or other motor to the steering gear. All these and other modifications I hold to be within the spirit of my invention if within the limits of the appended claims.

Reverting to the operation of the pump and motor this may be stated briefly as follows:— Assuming that in Fig. 4 which shows sectional view of the pump, the direction of the shaft is over at the top toward the observer and the tilting head 204 is in vertical position, the cylinder casing 202 which is keyed to the shaft, and the tilting head 204, together with the connecting rods, pistons, etc., rotate with the shaft, but the pistons do not reciprocate. If now the tilting head is moved from the vertical position as shown in Fig. 4, all the pistons on the farther side of the pump will draw oil out and pistons on the near side of pump will force oil through chambers 205 and 206, which chambers are connected by pipes to corresponding chambers of the motor, Fig. 3. When the piston is at the top or bottom of its revolution, there is no movement of the piston for an instant, as it is then covered by the partition between the chambers. As the oil which is forced by the pistons on the near side of the pump, Fig. 4, must flow into the cylinders of the farther side of the fluid motor, Fig. 3, the pistons on that side of the motor, Fig. 3, must be withdrawn, consequently the tilting head 204 and cylinder head 402, would be driven in the direction so as to rotate the shaft over toward the observer. Assuming now that the shaft in pump, Fig. 4, rotates in the same direction but that the tilting head 204 is moved from a vertical position in the opposite direction, direction of the flow of oil would be such that oil would be forced by the pistons on the farther side of the pump and withdrawn by the pistons on the near side of the pump, which would result in the shaft, Fig. 3, rotating in the opposite direction.

What I therefore claim and desire to secure by Letters Patent, is:

In combination a motor adapted to be run constantly in one direction, a reversible and variable speed fluid delivery pump, means for constantly driving said pump from said motor, a steering post, a rotary fluid pressure motor connected to receive motive fluid from said pump, and gearing between the shaft of said rotary motor and the steering post.

In testimony whereof, I affix my signature in presence of two witnesses.

JACOB R. ANDREWS.

Witnesses:
G. W. MERRILL,
C. B. MAGOINE.